May 20, 1969  M. D. PENNINGS  3,444,612
WIRE BONDING METHOD

Filed April 10, 1967

INVENTOR.
MATHEUS D. PENNINGS
BY
*A. C. Smith*
ATTORNEY 3,444,612
WIRE BONDING METHOD
Matheus D. Pennings, Palo Alto, Calif., assignor to Engineered Machine Builders Co., Inc., a corporation of California
Filed Apr. 10, 1967, Ser. No. 629,504
Int. Cl. B23k 31/02, 1/06
U.S. Cl. 29—471.1    2 Claims

ABSTRACT OF THE DISCLOSURE

Welding apparatus includes optical means for locating a weld target on a workpiece and includes a welder tip which is mounted to extend automatically into alignment over the weld target and then descend any random distance to contact the workpiece at the weld target.

Background of the invention

Conventional ultrasonic wire bonders used to bond a connecting wire between weld targets on a workpiece, for example, between a semiconductor die contact and a header post or lead-in wire, typically require the welder tip and an end of a length of connecting wire to be manipulated into position over a weld target. This necessitates setting the welder tip slightly above the weld target as the tip and workpiece are relatively positioned and then dropping the welder tip and an end of the connecting wire into contact with the workpiece to complete the weld of the connecting wire to the workpiece at the target. A similar operation is then performed at a second location on the workpiece to complete the connection of a wire between two weld targets. Conventional ultrasonic wire bonders of this type are described in U.S. patent application Ser. No. 515,005 filed on Dec. 20, 1965 by Matheus D. Pennings, and now issued as U.S. Patent 3,305,157. One disadvantage encountered with apparatus of this type is that an additional elevational setting of the welder tip above the workpiece with concomitant delay in unit production time is required to sight the welder tip and connecting wire into position over each of the two weld targets at the ends of a connecting wire.

Summary of the invention

In the illustrated embodiment of the invention, a weld target is merely sighted on a workpiece using a set of cross hairs in optical means similar to a bombsight and the welder tip is then automatically positioned in vertical alignment over the weld target and dropped a variable distance into contact with the workpiece at the weld target. This obviates the need for the time-consuming step of setting the welder tip above each of the weld targets during the positioning of the workpiece on a target beneath the welder tip.

Description of the preferred embodiment

Figure 1:
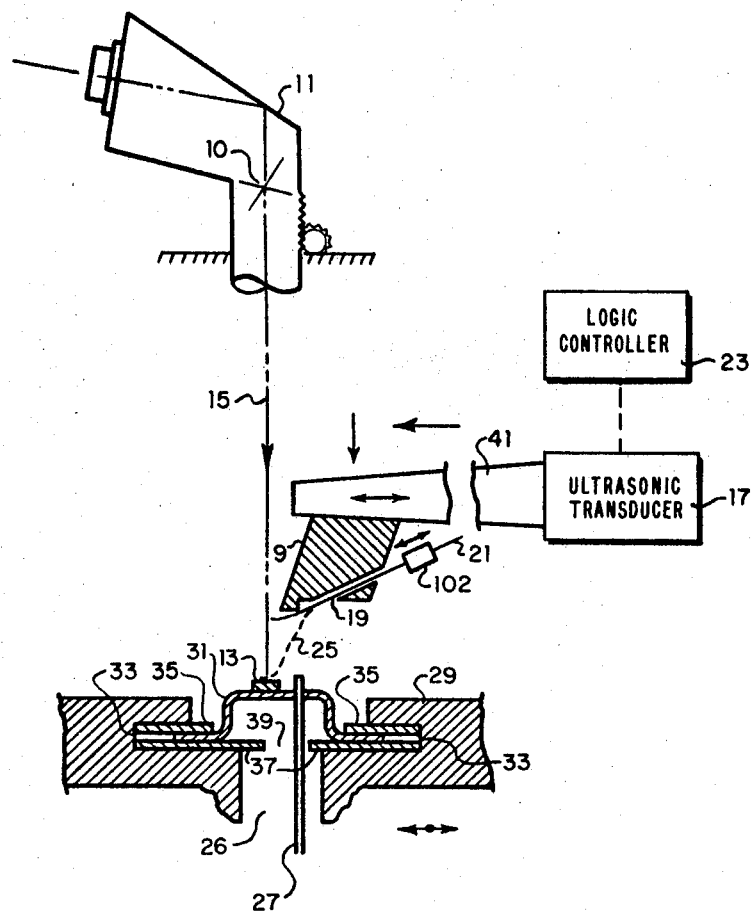
FIGURE 1 is a simplified side-sectional view of the welding apparatus of the present invention showing the welder tip retracted away from the field of view of the target sighting means.

The welder apparatus of the present invention has two general operating states. In the first operating state, the welder tip 9 is disposed above and back away from a selected welding target on a workpiece 13. This welding target is sighted with the aid of cross hairs 10 in optical means 11 along a substantially vertical optical alignment axis 15. The optical sighting means 11 is fixed in permanent position and the workpiece 13 is supported on support block 29 which is movable about orthogonal axes normal to the vertical optical alignment axis 15 in order to position the welding target on the workpiece 13 beneath the cross hairs 10 in the optical alignment means 11. When the workpiece 13 is properly aligned with a selected welding target in line with the optical alignment axis 15, the welding apparatus of the present invention then operates in its second mode of operation whereby the welder tip 9, together with the associated ultrasonic transducer 17 attached thereto, moves forward a few thousandths of an inch into alignment with the optical alignment axis 15 and moves downward a variable distance to bring the length of connecting wire 21 beneath the work surface of the welder tip 9 into contact with the welding target on the workpiece 13. A guide channel 19 in the welder tip 9 guides a length of connecting wire 21 into position beneath the work surface of the welder tip 9. Thus, as the welder tip 9 comes down into contact with the workpiece 13 at the selected welding target, an end of the connecting wire 21 is positioned between the work surface of the welder tip 9 and the welding target on workpiece 13. The logic controller 23 then excites the ultrasonic transducer 17 to produce momentary burst of translational oscillatory movement of the welder tip 9 in the plane of the surface of workpiece 13, thereby bonding one end of the connecting wire 21 to the welding target on workpiece 13. When the ultrasonic energy supplied to the welding tip 9 ceases, the logic controller 23 operates mechanical means for elevating and retracting the welder tip 9 and ultrasonic transducer 17 above the workpiece 13 and back away from the optical alignment axis 15. The length of connecting wire 21 is free to slide within the guide channel 19 and thus the connecting wire 21 assumes the shape indicated generally by 25 in FIGURE 1. With the welder tip 9 and ultrasonic transducer 17 in the elevated, retracted position as shown in FIGURE 1, another welding target may be selected, for example, on the top surface of the header lead-in wire 27. Thus, the support block 29 is again positioned along orthogonal axes in a plane normal to the optical alignment axis 15 in order to bring the top surface of the lead-in post 27 into position beneath the optical alignment axis 15. Since the length of connecting wire 21 is free to slide within the guide channel 19, the wire will then assume a position of laying directly across the selected welding target on the top surface of the lead-in post 27. The logic controller 23 is then actuated to extend welder tip 9 and ultrasonic transducer 17 into position of alignment with the optical alignment axis 15 and then to lower the tip 9 a variable distance into contact with the top surface of the lead-in post 27. With the length of connecting wire 21 disposed between the work surface of the welder tip 9 and the top surface of the lead-in post 27, the logic controller 23 again momentarily excites the ultrasonic transducer 17 to produce a burst of translational oscillatory movement of the welder tip in the plane of the top surface of the lead-in post 27, thereby bonding the connecting wire 21 to the lead-in post 27. The length of connecting wire 21 then is clamped against movement in the guide channel 19 by wire clamp 10 as the welder tip is again elevated above the workpiece and retracted away from the optical alignment axis. This causes the length of connecting wire to break off at the weakened point along its length that exists at the edge of the weld to the top surface of the lead-in post 27. This completes the two-step operation for welding a length of connecting wire 21 between a selected target on the workpiece 13 and another selected target on the top surface of lead-in port 27.

At the end of the two-weld process for connecting a length of wire between two weld targets, the header 31 to which the semiconductor die workpiece 13 is attached, is moved out of position and a new header and workpiece are slid along the groove 26 and support track 33 in the support block 29 into coarse position beneath the optical alignment axis 15. To facilitate this procedure in a high unit-production setup, each of the headers 31 is disposed between upper and lower indexing strips 35 and 37 to form an elongated rack of headers positioned at regular intervals along the length of the rack. The lower strip 37 may include square holes 39 or holes of other shape suitable for positioning each of the headers in a rack in substantially the same coarse angular position about the optical alignment axis 15. Fine angular positioning of the welder tip 9 with respect to the rack of headers 31 may thus be accomplished by positioning the welder tip and ultrasonic transducer 17 at any selected angular position about the optical alignment axis 15. Thus, each two-step welding process to connect a wire between selected weld targets on each workpiece is performed at the same angular positional setting of the welder assembly including tip 9, arm 41 and transducer 17 about the optical alignment axis 15.

The length of connecting wire between two selected weld targets may be looped or bowed upwardly above the work surface, for example, to serve as a jumper over a cross wire simply by altering the elevation above the workpiece to which the welder tip 9 and guide channel 19 are retracted. It should be apparent that the shape 25 of the length of wire 21 connected to the first weld target is thus looped or bowed upwardly commencing at the edge of the weld to the workpiece 13 by an amount determined by the elevation at which the welder tip 9 is positioned after the first weld is completed. Thus, when the welder tip 9 is again lowered into position at a second location on the workpiece, the shape 25 of the connecting wire 21 thus remains substantially looped as the connecting wire 21 slides freely through the guide channel 19 and becomes clamped between the second weld target and the work surface of the welder tip 9. Thus the degree of looping of connecting wires is controlled simply by altering the elevation to which the welder tip 9 is retracted following completion of the first weld.

Figure 2:
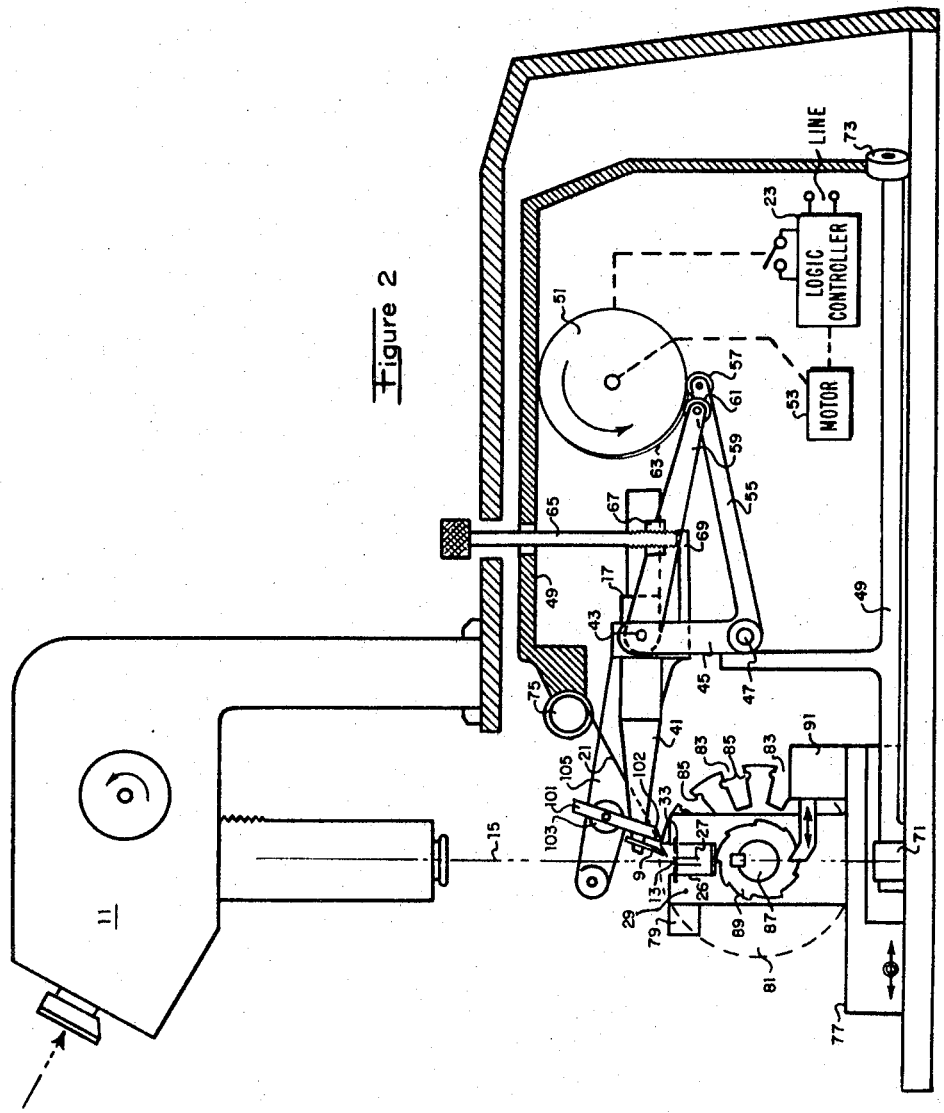
FIGURE 2 is a detailed side view of the apparatus of the present invention.
Figure 3:
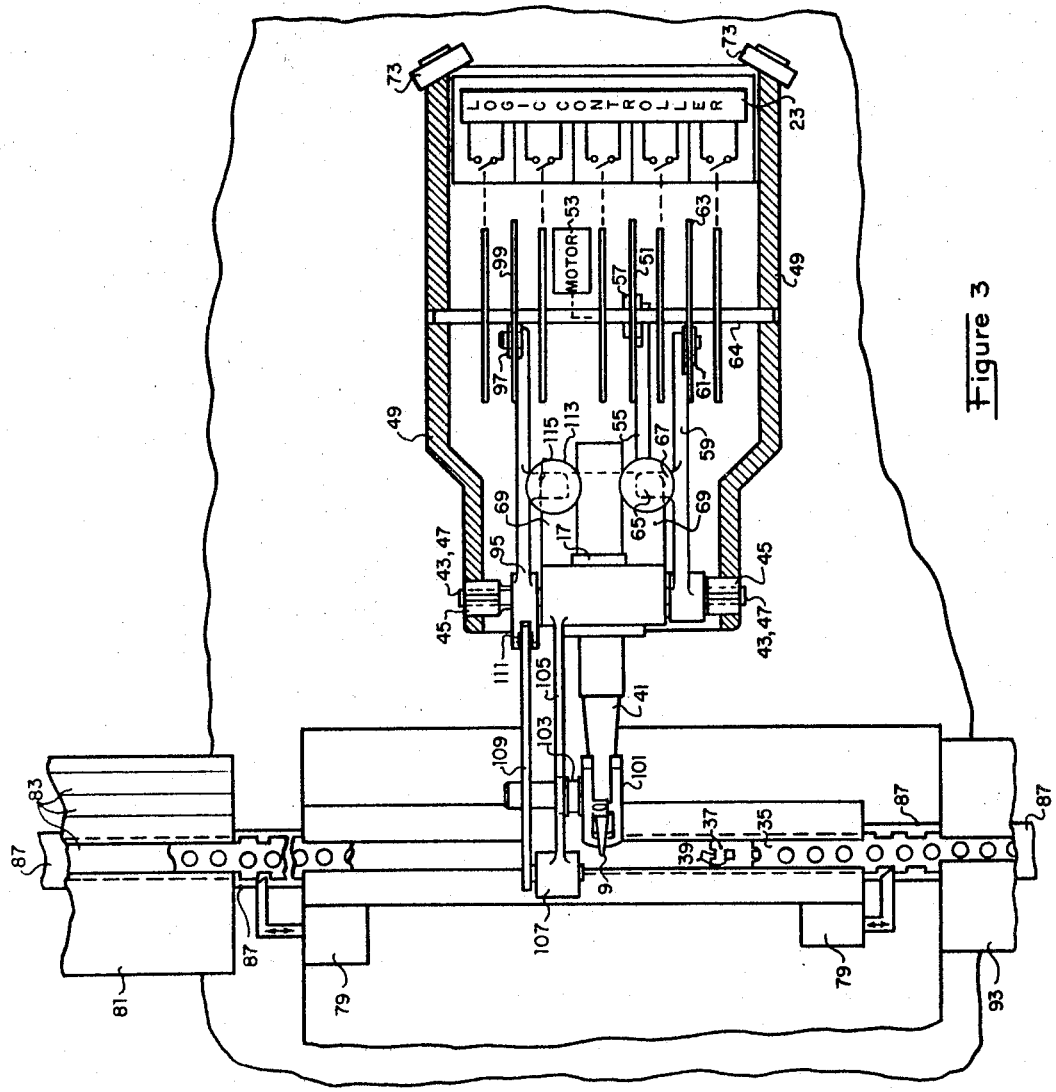
FIGURE 3 is a detailed top view of the apparatus of FIGURE 2.

Referring now to FIGURES 2 and 3, there are shown detailed side and top views of the welder apparatus of the present invention which automatically accomplishes the two-step welding process described in connection with FIGURE 1. The welder assembly including tip 9, the welding arm 41 and the ultrasonic transducer 17 are pivotally mounted about axis 43 on the yoke-like frame 45 which, in turn, is pivoted about axis 47 supported on the welder case 49. The frame 45 is actuated about its pivot axis 47 in response to rotation of the cam 51 through a selected angular rotation by motor 53. The arm 55 and roller 57 attached to the frame 45 cooperate with the cam 51 to move the upper pivot 43 in a substantially horizontal plane as cam 51 is rotated. Thus, the welder tip 9 is retracted and extended with respect to the optical alignment axis 15 in response to the rotation of cam 51 acting upon the arm 55 attached to frame 45. The elevational position of the tip 9 with respect to a workpiece 13 is controlled by arm 59 and roller 61 attached thereto which cooperate with another similar cam 63 to rotate the arm 59 about the pivot axis 43. The rotational movement of arm 59 about pivot axis 43 is coupled to the welder assembly 9, 41, 17 through an elevational adjustment screw 65 which screws into a web 67 on the arm 59 and bears against the plate 69 that form a portion of the welder assembly 9, 41, 17. Thus, it is apparent that the position to which the welder tip 9 is elevated following completion of a weld at a selected target on workpiece 13 is determined by the setting of the adjustment screw 65. When this adjustment screw 65 is set at a small or short protrusion between the web 67 and plate 69, the downward rotation of arm 59 about pivot 43 in response to rotation of the cam 63 causes engagement of the adjustment screw 65 and the plate 69 only near the terminal end of the tip-raising movement and thereby produces only a small elevation of the tip 9. Similarly, when the adjustment screw 65 is set at a large or long protrusion between web 67 and plate 69, the tip 9 is elevated during substantially the entire rotational movement of arm 59 in response to rotation of the cam 63. It should be apparent, therefore, that the welder tip 9 may engage the surface of a workpiece 13 at any elevational position during the downward motion of the tip 9 for the arm 59 and adjustment screw 65 carried thereby simply disengage from the plate 69 of the welder assembly 9, 41, 17 when the tip 9 engages the surfaces of the workpiece. The adjustment screw 65 need only be set to provide clearance for the highest elevational position on a workpiece and the apparatus of the present invention will perform the two-weld bonding of a length of wire between selected welding targets without the conventional requirement of establishing intermediate elevational settings of the welder tip.

The welder assembly and pivoted frame 45 are supported on welder case 49 which is pivoted about bearing 71 and supported by rollers 73 for rotation about the optical alignment axis 15. A length of connecting wire 21 from spool 75 supported on the welder case 49 may thus be pulled in any radial direction about the optical alignment axis 15 from a first weld on a workpiece 13 toward a second weld target on the same workpiece. The alignment of each of the first and second weld targets on a workpiece may thus be selected with respect to the permanent alignment axis 15 by positioning the support block 29 and mount 77 therefor along orthogonal axes using conventional pantographic mechanical coupling to a manual positioner. Also, suitable indexing means 79 may be provided for automatically advancing the rack which comprises the upper and lower indexing strips 35 and 37 for sequentially indexing workpieces 13 into coarse position beneath the optical alignment axis 15. These racks are stored in cylindrical barrels 81, each containing a plurality of longitudinal slots 83 for receiving the racks and holding them in guide slots 85. A barrel 81 is supported on a rotatable shaft 87 which, in turn, may be keyed to a ratchet wheel 89 and rotating mechanism 91 for automatically rotating the barrel into position to supply a new rack of indexed workpieces 13. Thus, a barrel 81 loaded with unfinished workpieces 13 may be positioned on the left-hand side of the machine to supply the racks of workpieces automatically and sequentially through the machine for the two-step welding process to connect a length of wire between two weld targets on each workpiece and a receiver barrel 93 may be positioned at the right-hand side of the machine to receive the racks of completed workpieces. In this way, single barrels need only be handled, each comprising a great many of the workpieces 13 and these barrels need only be loaded into and removed from the machine of the present invention after a great many workpieces 13 have been completed.

Referring now to FIGURE 3, there is shown a detailed view of the welding apparatus of the present invention. The pivoting frame 45 is shown as a yoke-shaped device which is pivoted about the axis 47 and which includes end portions that support the extreme ends of the pivot shaft 43. Arm 55 and roller 57 engage the cam 51 which is supported on cam shaft 64. The welder assembly 9, 41, 17 is supported on shaft 43 in central position between the end pieces of the yoke-shaped frame 45 and between the arm 59 on one side and arm 95 on the other side. Arm 95 is rotatably supported about the same axis 43 as is arm 59 and is of substantially the same shape as arm 59 shown in side view in FIGURE 2. This arm 95 includes a roller 97 which cooperates with cam 99 on cam shaft 64 for controllably advancing the length of connecting wire 21 from the spool 75. A wire clamp 101 which is preferably electromagnetically operated by the coil 103 is supported on the wire feed arm 109. This arm 109 is pivotally supported by pivot bearing 107 to the arm 105 which is rigidly attached to the welder assembly 9, 41, 17 for rotation therewith about shaft 43. This wire feed arm 109 is mechanically coupled at 111 to the arm 95 to undergo rotational motion about pivot bearing 107 in response to rotation of the cam 99. The wire clamp 101 having jaws 102 disposed immediately adjacent the back side of the welder tip 9 in alignment with the connecting wire 21 thus undergoes arcuate movement along a path of controllable length to advance the length of connecting wire 21 a selected distance beneath the work surface of the welder tip 9. The length of wire thus advanced is controlled by the setting of adjustment screw 113 which is carried by the case 49 and which bears against the web 115 on arm 95. Thus, the relative position of the web 115 on arm 95 and the case 49 as determined by the setting of adjustment screw 113 determines the point at which the roller 97 on arm 95 no longer follows the peripheral contour of cam 99. Since the rollers 61 and 97 attached to arms 59 and 95 communicate with tangential portions of their associated cams which are substantially in line with pivot axis 43, the tilting of frame 45 about pivot axis 47 to retract and extend the welder tip does not significantly affect either the elevational position of the tip 9 or the advance of connecting wire 21 beneath the tip 9.

Therefore, the welding apparatus of the present invention provides the simple means by which a connecting wire or other element may be welded to a selected target area without the requirement initially of positioning the tip in substantial location over which the weld is to be produced. Also, the apparatus of the present invention enables the welder tip to be retracted out of the field of view of an optical sighting means by which a target area is selected. Further, the present invention is rendered more useful for high unit-production operation by the use of cylindrical storage means of elongated racks of selected individual workpieces.

I claim:
1. The method of attaching a length of conductor to a target area on a workpiece comprising the steps of:

optically sighting along an alignment axis for a selected target area on a workpiece;
producing relative motion between a conductor and the alignment axis over a selected distance in a direction toward the axis;
producing relative motion between the conductor and the workpiece over a selected distance in a direction along said alignment axis;
applying force to the conductor in a direction toward the workpiece; and
fixedly attaching the conductor during the application of force thereto to bond the conductor to the workpiece at said target area.

2. The method as in claim 1 comprising the additional steps of:
elevating the following length of the conductor by a selected distance above the workpiece and displacing the following length of conductor away from the alignment axis;
optically sighting a second target area on the workpiece while the conductor is held in elevated and displaced position;
positioning the following length of conductor to cross the second target area;
applying force to the conductor in a direction toward the workpiece; and
fixedly attaching the conductor to bond the same to the workpiece at the second target area.

References Cited
UNITED STATES PATENTS

| | | | |
|---|---|---|---|
| 3,328,875 | 7/1967 | Pennings | 228—1 |
| 3,305,157 | 2/1967 | Pennings | 228—1 |
| 3,216,640 | 11/1965 | Szasz | 228—3 |

RICHARD H. EANES, JR., *Primary Examiner.*

U.S. Cl. X.R.

228—1